(12) United States Patent
Ben Himane

(10) Patent No.: US 11,682,138 B2
(45) Date of Patent: Jun. 20, 2023

(54) LOCALIZATION AND MAPPING USING IMAGES FROM MULTIPLE DEVICES

(71) Applicant: Apple Inc., Cupertino, CA (US)

(72) Inventor: Mohamed Selim Ben Himane, Milpitas, CA (US)

(73) Assignee: Apple Inc., Cupertino, CA (US)

(*) Notice: Subject to any disclaimer, the term of this patent is extended or adjusted under 35 U.S.C. 154(b) by 27 days.

(21) Appl. No.: 17/524,298

(22) Filed: Nov. 11, 2021

(65) Prior Publication Data

US 2022/0067966 A1 Mar. 3, 2022

Related U.S. Application Data

(63) Continuation of application No. 16/554,461, filed on Aug. 28, 2019, now Pat. No. 11,189,054.

(60) Provisional application No. 62/738,242, filed on Sep. 28, 2018.

(51) Int. Cl.
*G06T 7/70* (2017.01)
*G06T 7/73* (2017.01)
*G06T 7/246* (2017.01)
*G06T 19/00* (2011.01)

(52) U.S. Cl.
CPC ............... *G06T 7/75* (2017.01); *G06T 7/251* (2017.01); *G06T 19/006* (2013.01)

(58) Field of Classification Search
CPC .......... G06T 2207/30244; G06T 7/251; G06T 2207/10012; G06T 7/75; G06T 19/006; G06T 7/73
See application file for complete search history.

(56) References Cited

U.S. PATENT DOCUMENTS

2020/0105015 A1 4/2020 Ben Himane
2020/0241649 A1 7/2020 Stafford et al.

OTHER PUBLICATIONS

Notice of Allowance received for U.S. Appl. No. 16/554,461, dated Aug. 11, 2021, 8 pages.

*Primary Examiner* — Sam Bhattacharya
(74) *Attorney, Agent, or Firm* — DLA Piper LLP (US)

(57) ABSTRACT

The present disclosure relates generally to localization and mapping. In some examples, an electronic device obtains first image data and motion data using a motion sensor. The electronic device receives information corresponding to a second electronic device. The electronic device generates a representation of a first pose of the first electronic device using the first image data, the motion data, and the information corresponding to the second electronic device. The electronic device displays, on the display, a virtual object, wherein the displaying of the virtual object is based on the representation of the first pose of the first electronic device.

20 Claims, 8 Drawing Sheets

LOCALIZATION AND MAPPING USING IMAGES FROM MULTIPLE DEVICES

CROSS-REFERENCE TO RELATED APPLICATIONS

This application is a continuation of U.S. patent application Ser. No. 16/554,461, entitled "LOCALIZATION AND MAPPING USING IMAGES FROM MULTIPLE DEVICES," filed Aug. 28, 2019, which claims priority to U.S. Provisional Patent Application Ser. No. 62/738,242, entitled "LOCALIZATION AND MAPPING USING IMAGES FROM MULTIPLE DEVICES," filed Sep. 28, 2018, the contents of each of which are hereby incorporated by reference in their entireties.

TECHNICAL FIELD

The present disclosure relates generally to computer vision, and more specifically to techniques for performing localization and mapping.

BACKGROUND

Some techniques for displaying computer-generated content on a device inaccurately augment the physical environment using the computer-generated content. For example, a virtual object can be displayed at an inaccurate location with respect to the physical environment.

SUMMARY

Described herein are techniques for determining an accurate estimate of a pose of a device to properly augment the physical environment with computer-generated content. This results in a better user experience when computer-generated reality (CGR) techniques are being performed.

In accordance with some examples, a method is described. The method is performed at a first electronic device with a display, a camera sensor, and a motion sensor. The method comprises: obtaining first image data; obtaining motion data using the motion sensor; receiving information corresponding to a second electronic device; generating a representation of a first pose of the first electronic device using the first image data, the motion data, and the information corresponding to the second electronic device; and displaying, on the display, a virtual object, wherein the displaying of the virtual object is based on the representation of the first pose of the first electronic device.

In accordance with some examples, a non-transitory computer-readable storage medium is described. The non-transitory computer-readable storage medium stores one or more programs configured to be executed by one or more processors of an electronic device with a display, a camera sensor, and a motion sensor. The one or more programs include instructions for: obtaining first image data; obtaining motion data using the motion sensor; receiving information corresponding to a second electronic device; generating a representation of a first pose of the first electronic device using the first image data, the motion data, and the information corresponding to the second electronic device; and displaying, on the display, a virtual object, wherein the displaying of the virtual object is based on the representation of the first pose of the first electronic device.

In accordance with some examples, a transitory computer-readable storage medium is described. The transitory computer-readable storage medium stores one or more programs configured to be executed by one or more processors of an electronic device with a display, a camera sensor, and a motion sensor. The one or more programs include instructions for: obtaining first image data; obtaining motion data using the motion sensor; receiving information corresponding to a second electronic device; generating a representation of a first pose of the first electronic device using the first image data, the motion data, and the information corresponding to the second electronic device; and displaying, on the display, a virtual object, wherein the displaying of the virtual object is based on the representation of the first pose of the first electronic device.

In accordance with some examples, an electronic device is described. The electronic device comprises: a display; a camera sensor; a motion sensor; one or more processors; and memory storing one or more programs configured to be executed by the one or more processors. The one or more programs include instructions for: obtaining first image data; obtaining motion data using the motion sensor; receiving information corresponding to a second electronic device; generating a representation of a first pose of the first electronic device using the first image data, the motion data, and the information corresponding to the second electronic device; and displaying, on the display, a virtual object, wherein the displaying of the virtual object is based on the representation of the first pose of the first electronic device.

In accordance with some examples, an electronic device is described. The electronic device comprises: a display; a camera sensor; a motion sensor; means for obtaining first image data; means for obtaining motion data using the motion sensor; means for receiving information corresponding to a second electronic device; means for generating a representation of a first pose of the first electronic device using the first image data, the motion data, and the information corresponding to the second electronic device; and means for displaying, on the display, a virtual object, wherein the displaying of the virtual object is based on the representation of the first pose of the first electronic device.

In accordance with some examples, a method is described. The method is performed at a first electronic device. The method comprises: receiving, from a second electronic device, first image data and a representation of a first pose of the second electronic device in a three-dimensional space, wherein the representation of the first pose of the second electronic device corresponds to the first image data; receiving, from a third electronic device, second image data and a representation of a second pose of the third electronic device in the three-dimensional space, wherein the representation of the second pose of the third electronic device corresponds to the second image data; generating a representation of one or more features in the three-dimensional space, wherein the representation of the one or more features is generated using the first image data, the representation of the first pose, the second image data, and the representation of the second pose; and transmitting the representation of the one or more features to the second electronic device and the third electronic device, wherein the representation of the one or more features is configured to be used by the second electronic device to generate a representation of a third pose of the second electronic device, and wherein the representation of the one or more features is configured to be used by the third electronic device to generate a representation of a fourth pose of the third electronic device.

In accordance with some examples, a non-transitory computer-readable storage medium is described. The non-transitory computer-readable storage medium stores one or more programs configured to be executed by one or more processors of an electronic device. The one or more programs include instructions for: receiving, from a second electronic device, first image data and a representation of a first pose of the second electronic device in a three-dimensional space, wherein the representation of the first pose of the second electronic device corresponds to the first image data; receiving, from a third electronic device, second image data and a representation of a second pose of the third electronic device in the three-dimensional space, wherein the representation of the second pose of the third electronic device corresponds to the second image data; generating a representation of one or more features in the three-dimensional space, wherein the representation of the one or more features is generated using the first image data, the representation of the first pose, the second image data, and the representation of the second pose; and transmitting the representation of the one or more features to the second electronic device and the third electronic device, wherein the representation of the one or more features is configured to be used by the second electronic device to generate a representation of a third pose of the second electronic device, and wherein the representation of the one or more features is configured to be used by the third electronic device to generate a representation of a fourth pose of the third electronic device.

In accordance with some examples, a transitory computer-readable storage medium is described. The transitory computer-readable storage medium stores one or more programs configured to be executed by one or more processors of an electronic device. The one or more programs include instructions for: receiving, from a second electronic device, first image data and a representation of a first pose of the second electronic device in a three-dimensional space, wherein the representation of the first pose of the second electronic device corresponds to the first image data; receiving, from a third electronic device, second image data and a representation of a second pose of the third electronic device in the three-dimensional space, wherein the representation of the second pose of the third electronic device corresponds to the second image data; generating a representation of one or more features in the three-dimensional space, wherein the representation of the one or more features is generated using the first image data, the representation of the first pose, the second image data, and the representation of the second pose; and transmitting the representation of the one or more features to the second electronic device and the third electronic device, wherein the representation of the one or more features is configured to be used by the second electronic device to generate a representation of a third pose of the second electronic device, and wherein the representation of the one or more features is configured to be used by the third electronic device to generate a representation of a fourth pose of the third electronic device.

In accordance with some examples, an electronic device is described. The electronic device comprises: one or more processors; and memory storing one or more programs configured to be executed by the one or more processors. The one or more programs include instructions for: receiving, from a second electronic device, first image data and a representation of a first pose of the second electronic device in a three-dimensional space, wherein the representation of the first pose of the second electronic device corresponds to the first image data; receiving, from a third electronic device, second image data and a representation of a second pose of the third electronic device in the three-dimensional space, wherein the representation of the second pose of the third electronic device corresponds to the second image data; generating a representation of one or more features in the three-dimensional space, wherein the representation of the one or more features is generated using the first image data, the representation of the first pose, the second image data, and the representation of the second pose; and transmitting the representation of the one or more features to the second electronic device and the third electronic device, wherein the representation of the one or more features is configured to be used by the second electronic device to generate a representation of a third pose of the second electronic device, and wherein the representation of the one or more features is configured to be used by the third electronic device to generate a representation of a fourth pose of the third electronic device.

In accordance with some examples, an electronic device is described. The electronic device comprises: means for receiving, from a second electronic device, first image data and a representation of a first pose of the second electronic device in a three-dimensional space, wherein the representation of the first pose of the second electronic device corresponds to the first image data; means for receiving, from a third electronic device, second image data and a representation of a second pose of the third electronic device in the three-dimensional space, wherein the representation of the second pose of the third electronic device corresponds to the second image data; means for generating a representation of one or more features in the three-dimensional space, wherein the representation of the one or more features is generated using the first image data, the representation of the first pose, the second image data, and the representation of the second pose; and means for transmitting the representation of the one or more features to the second electronic device and the third electronic device, wherein the representation of the one or more features is configured to be used by the second electronic device to generate a representation of a third pose of the second electronic device, and wherein the representation of the one or more features is configured to be used by the third electronic device to generate a representation of a fourth pose of the third electronic device.

DESCRIPTION

Figure 1A:
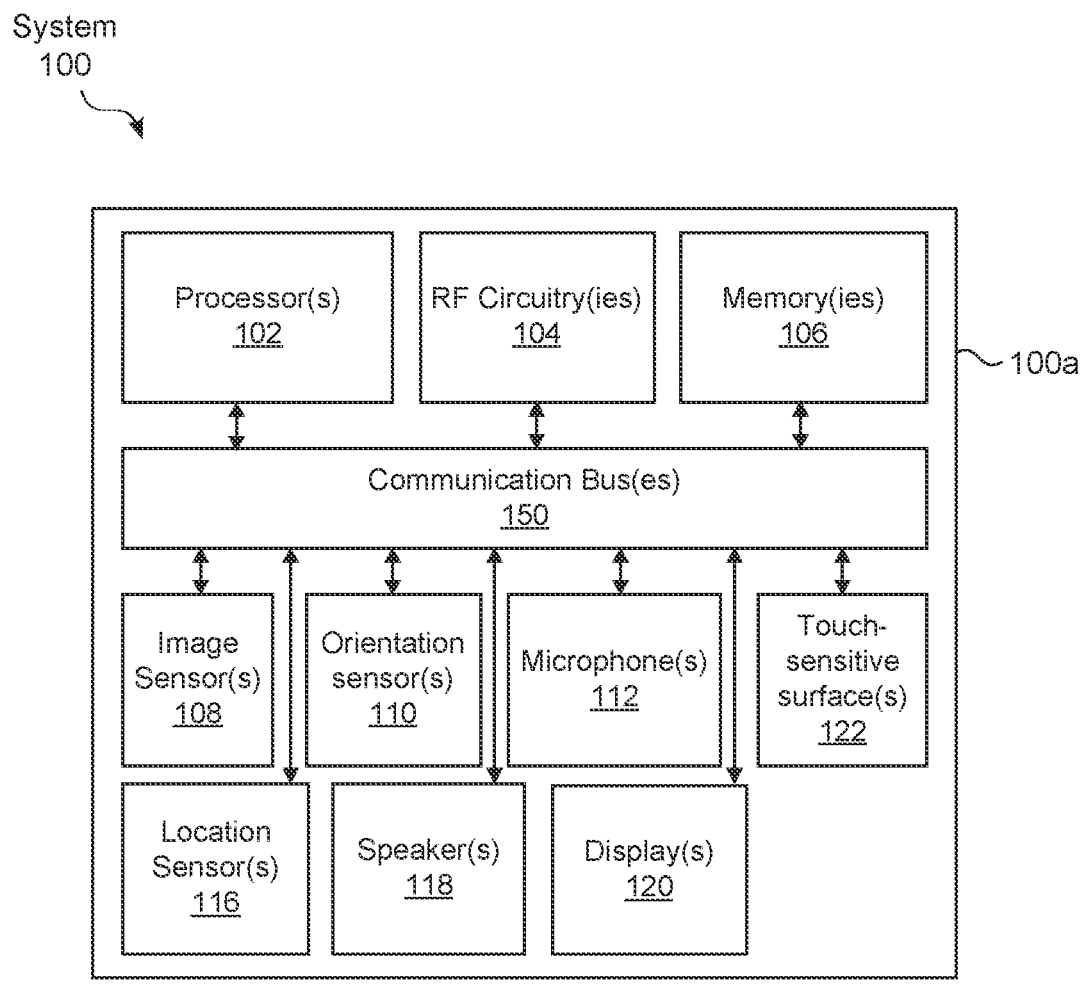
FIGS. 1A-1B depict exemplary systems for use in various CGR technologies.
Figure 1B:
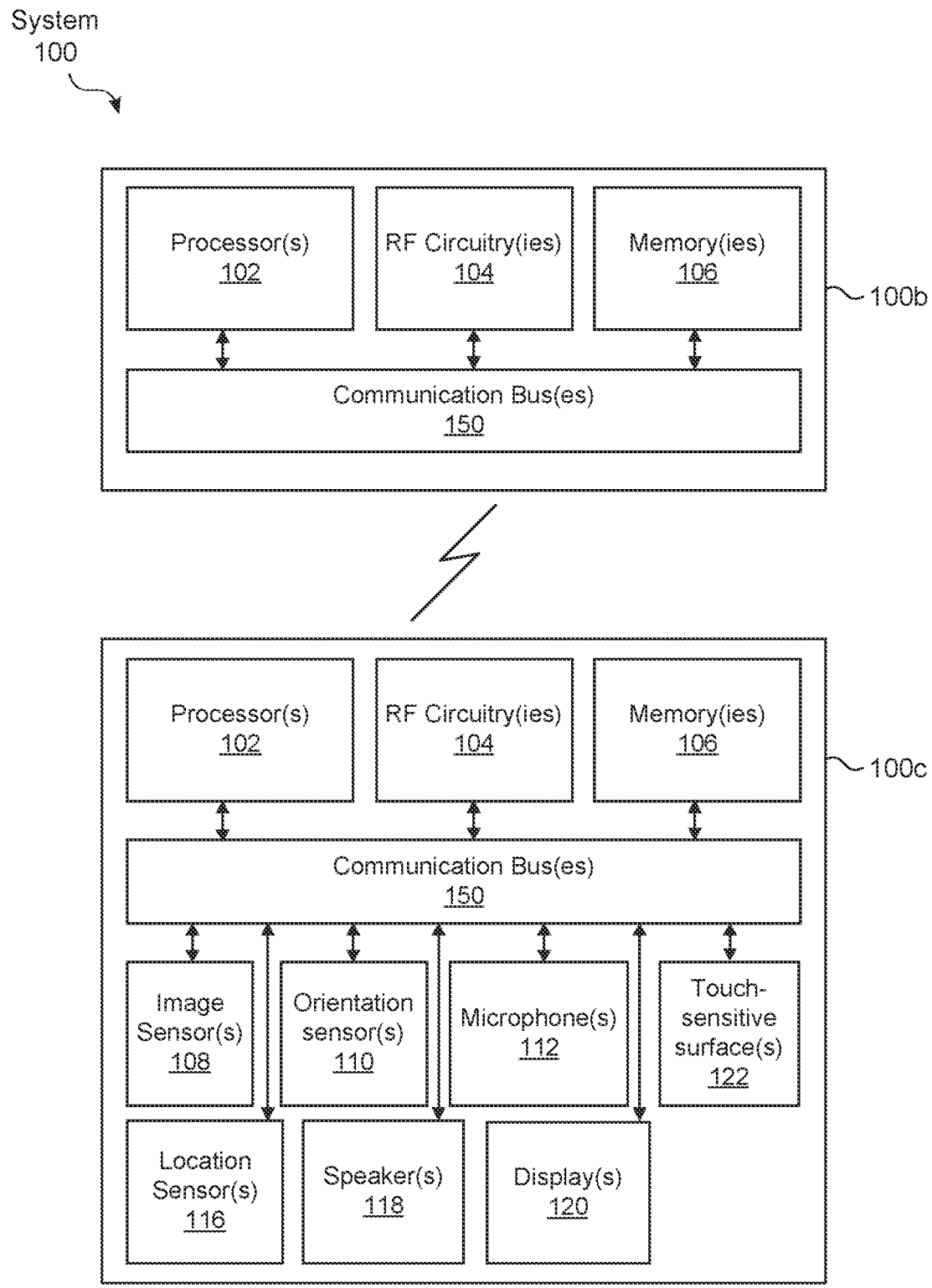

FIG. 1A and FIG. 1B depict exemplary system 100 for use in various CGR technologies.

In some examples, as illustrated in FIG. 1A, system 100 includes device 100a. Device 100a includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100a.

In some examples, elements of system 100 are implemented in a base station device (e.g., a computing device, such as a remote server, mobile device, or laptop) and other elements of the system 100 are implemented in a head-mounted display (HMD) device designed to be worn by the user, where the HMD device is in communication with the base station device. In some examples, device 100a is implemented in a base station device or an HMD device.

As illustrated in FIG. 1B, in some examples, system 100 includes two (or more) devices in communication, such as through a wired connection or a wireless connection. First device 100b (e.g., a base station device) includes processor(s) 102, RF circuitry(ies) 104, and memory(ies) 106. These components optionally communicate over communication bus(es) 150 of device 100b. Second device 100c (e.g., a head-mounted device) includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100c.

In some examples, system 100 is a mobile device. In some examples, system 100 is an HMD device. In some examples, system 100 is a wearable HUD device.

System 100 includes processor(s) 102 and memory(ies) 106. Processor(s) 102 include one or more general processors, one or more graphics processors, and/or one or more digital signal processors. In some examples, memory(ies) 106 are one or more non-transitory computer-readable storage mediums (e.g., flash memory, random access memory) that store computer-readable instructions configured to be executed by processor(s) 102 to perform the techniques described below.

System 100 includes RF circuitry(ies) 104. RF circuitry(ies) 104 optionally include circuitry for communicating with electronic devices, networks, such as the Internet, intranets, and/or a wireless network, such as cellular networks and wireless local area networks (LANs). RF circuitry(ies) 104 optionally includes circuitry for communicating using near-field communication and/or short-range communication, such as Bluetooth®.

System 100 includes display(s) 120. In some examples, display(s) 120 include a first display (e.g., a left eye display panel) and a second display (e.g., a right eye display panel), each display for displaying images to a respective eye of the user. Corresponding images are simultaneously displayed on the first display and the second display. Optionally, the corresponding images include the same virtual objects and/or representations of the same physical objects from different viewpoints, resulting in a parallax effect that provides a user with the illusion of depth of the objects on the displays. In some examples, display(s) 120 include a single display. Corresponding images are simultaneously displayed on a first area and a second area of the single display for each eye of the user. Optionally, the corresponding images include the same virtual objects and/or representations of the same physical objects from different viewpoints, resulting in a parallax effect that provides a user with the illusion of depth of the objects on the single display.

In some examples, system 100 includes touch-sensitive surface(s) 122 for receiving user inputs, such as tap inputs and swipe inputs. In some examples, display(s) 120 and touch-sensitive surface(s) 122 form touch-sensitive display(s).

System 100 includes image sensor(s) 108. Image sensors(s) 108 optionally include one or more visible light image sensor, such as charged coupled device (CCD) sensors, and/or complementary metal-oxide-semiconductor (CMOS) sensors operable to obtain images of physical objects from the physical environment. Image sensor(s) also optionally include one or more infrared (IR) sensor(s), such as a passive IR sensor or an active IR sensor, for detecting infrared light from the physical environment. For example, an active IR sensor includes an IR emitter, such as an IR dot emitter, for emitting infrared light into the physical environment. Image sensor(s) 108 also optionally include one or more event camera(s) configured to capture movement of physical objects in the physical environment. Image sensor(s) 108 also optionally include one or more depth sensor(s) configured to detect the distance of physical objects from system 100. In some examples, system 100 uses CCD sensors, event cameras, and depth sensors in combination to detect the physical environment around system 100. In some examples, image sensor(s) 108 include a first image sensor and a second image sensor. The first image sensor and the second image sensor are optionally configured to capture images of physical objects in the physical environment from two distinct perspectives. In some examples, system 100 uses image sensor(s) 108 to receive user inputs, such as hand gestures. In some examples, system 100 uses image sensor(s) 108 to detect the position and orientation of system 100 and/or display(s) 120 in the physical environment. For example, system 100 uses image sensor(s) 108 to track the position and orientation of display(s) 120 relative to one or more fixed objects in the physical environment. In some examples, system 100 uses image sensor(s) 108 that are inward facing (e.g., facing the user) for gaze tracking and/or hand motion tracking, which can be used, for example, to control a user's avatar.

In some examples, system 100 includes microphones(s) 112. System 100 uses microphone(s) 112 to detect sound from the user and/or the physical environment of the user. In some examples, microphone(s) 112 includes an array of microphones (including a plurality of microphones) that optionally operate in tandem, such as to identify ambient noise or to locate the source of sound in space of the physical environment.

System 100 includes orientation sensor(s) 110 for detecting orientation and/or movement of system 100 and/or display(s) 120. For example, system 100 uses orientation sensor(s) 110 to track changes in the position and/or orientation of system 100 and/or display(s) 120, such as with respect to physical objects in the physical environment. Orientation sensor(s) 110 optionally include one or more gyroscopes and/or one or more accelerometers.

A physical environment (or real environment) refers to a physical world that people can sense and/or interact with without aid of electronic systems. Physical environments, such as a physical park, include physical articles (or physical objects or real objects), such as physical trees, physical buildings, and physical people. People can directly sense and/or interact with the physical environment, such as through sight, touch, hearing, taste, and smell.

In contrast, a CGR environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality. A virtual reality (VR) environment (or virtual environment) refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of mixed realities include augmented reality and augmented virtuality. An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An AR environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one example, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Figure 2A:
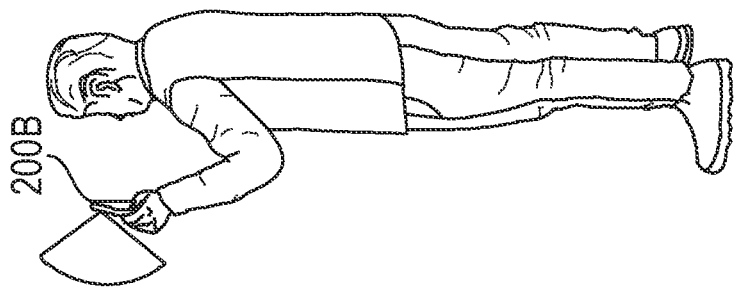
FIGS. 2A-2D illustrate an electronic device using CGR techniques.
Figure 2A:
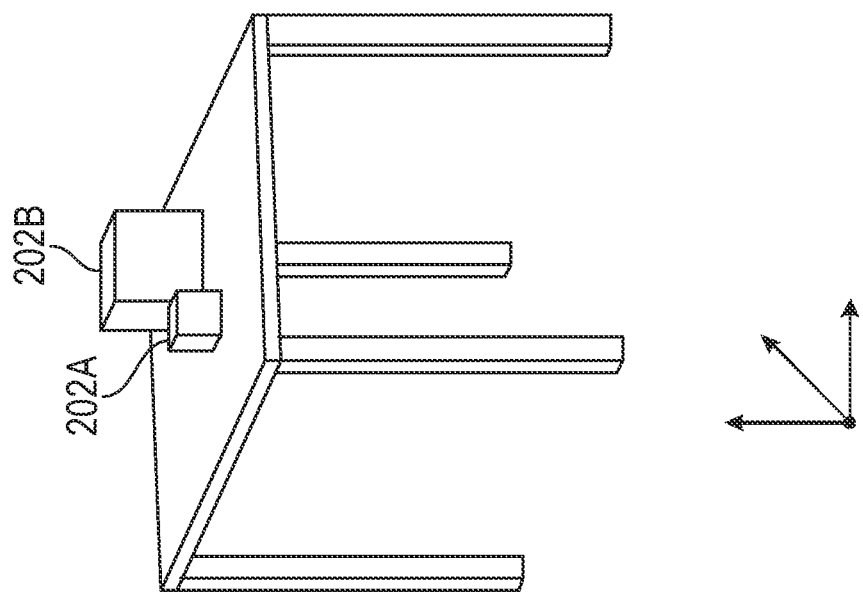
Figure 2A:
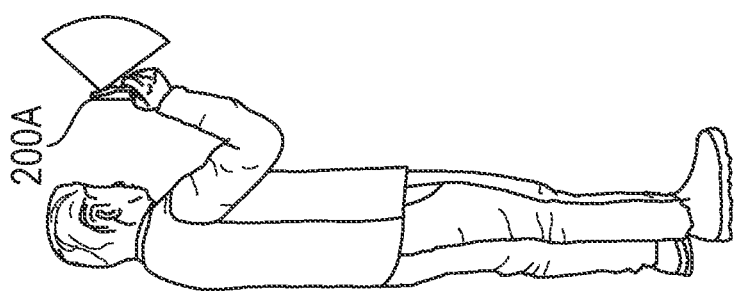

FIG. 2A illustrates electronic device 200A and electronic device 200B. Electronic device 200A and/or electronic device 200B can include some or all of the features of system 100 described above.

At FIG. 2A, electronic device 200A and electronic device 200B are being used to augment the user's view of the physical environment. Electronic device 200A and electronic device 200B display images of the physical environment for the user's viewing captured by the camera sensors of the respective devices (e.g., image sensor(s) 108). In addition to displaying images of physical objects such as cubes 202A and 202B, electronic device 200A and electronic device 200B display virtual objects such that the virtual objects appear to exist in the physical environment, thereby augmenting the user's view of the physical environment. However, to display virtual objects (or augment the physical environment in some other manner (e.g., changing the apparent color of a physical object)), it is advantageous for electronic device 200A and electronic device 200B to determine their own pose (e.g., position and orientation) with respect to the physical environment. The processes for determining an accurate estimate of the device's pose are described below with respect to FIGS. 2B-2D.

Figure 2B:
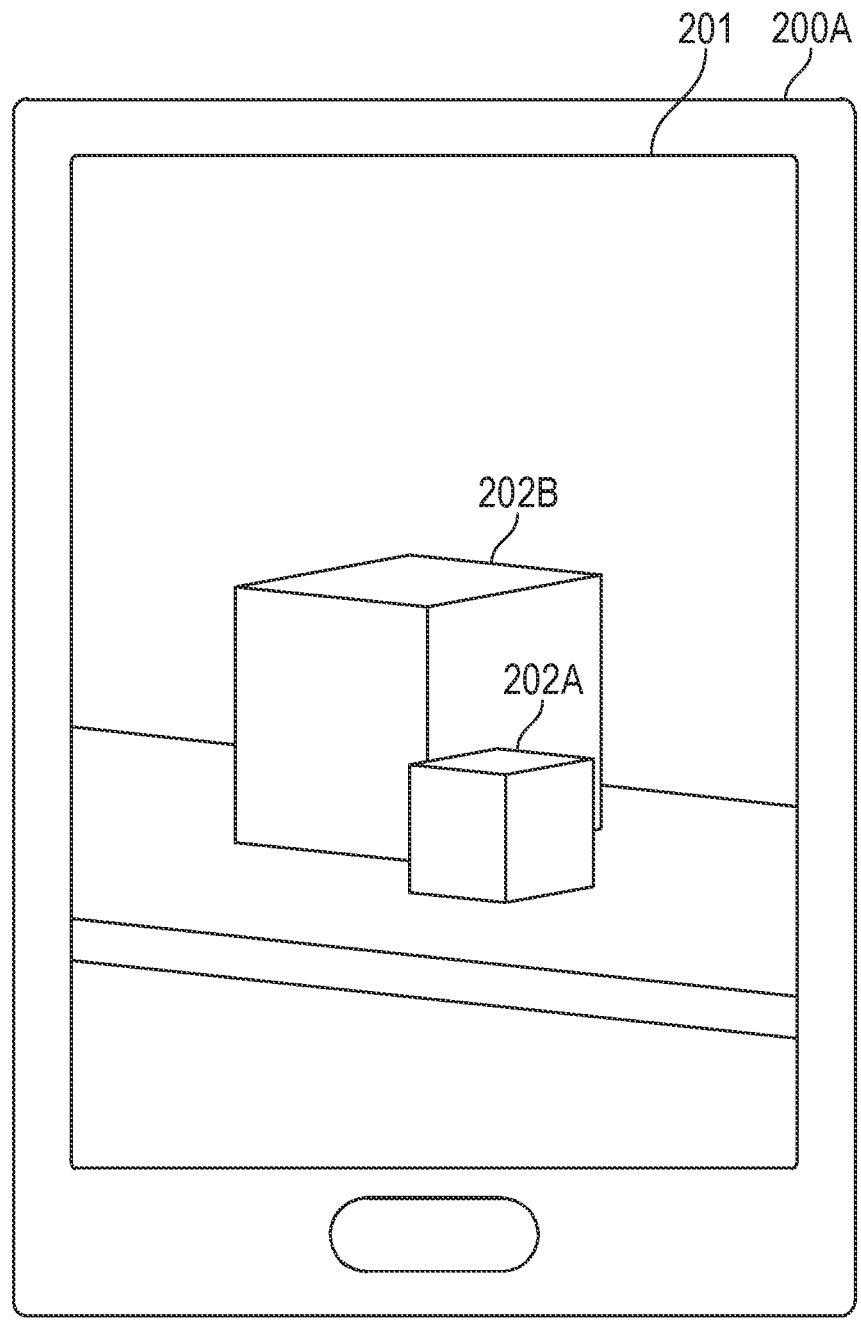

At FIG. 2B, electronic device 200A initiates a process for mapping and localizing device 200A with respect to the physical environment using, for example, a simultaneous localization and mapping (SLAM) technique, such as visual inertial odometry (VIO). Electronic device 200A captures images of cubes 202A and 202B via the camera sensor (e.g., image sensor(s) 108) located on the back of the device. Electronic device 200A displays these captured images via display 201. To determine its pose with respect to the physical environment, electronic device 200A uses the captured images in combination with data obtained via orientation sensor(s) 110 (e.g., an inertial sensor). Electronic device 200A detects notable features from the captured images (e.g., lines, segments, planes, points, and/or other 3D geometric elements and shapes) (e.g., edges or corners of cubes 202A and 202B that are in the field of view of the camera sensor) and estimates their position in 3D space while also estimating its own pose by iteratively minimizing an error function for the 3D position and pose estimations using the captured images and data obtained via orientation sensor(s) 110. Electronic device can update the 3D position and pose estimations across additional captured images as the device is moved.

Figure 2C:
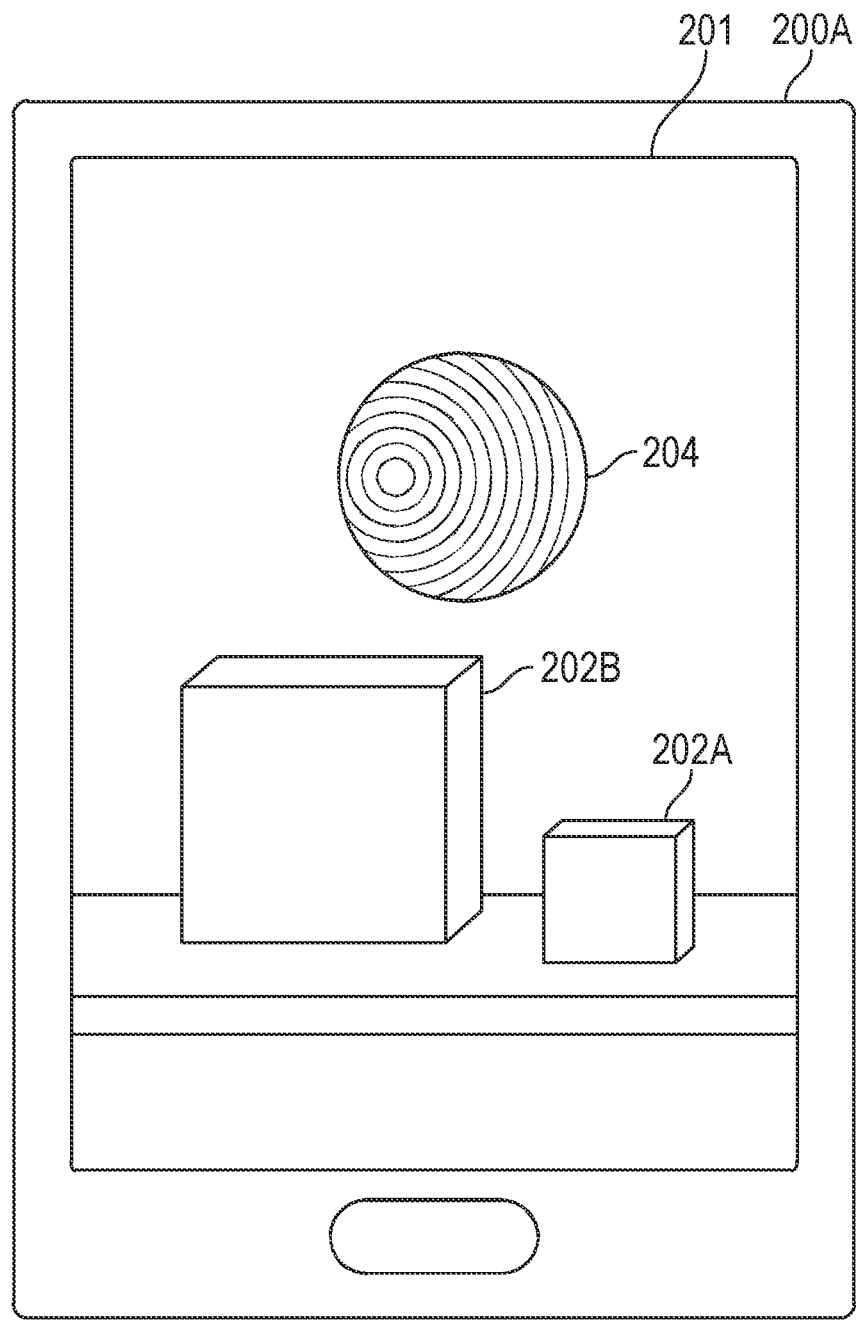

For example, at FIG. 2C, electronic device 200A is moved to a different position in the physical environment as part of the localization and mapping process. With cubes 202A and 202B still in the field of view of the camera sensor, electronic device 200A captures images of cubes 202A and 202B from a different viewing angle. Electronic device 200A displays these captured images via display 201. Electronic device 200A detects at least some of the features that were detected at FIG. 2B. By comparing the positions of the features in the captured images and incorporating data from orientation sensor(s) 110, electronic device updates its estimates for the 3D position of the features (e.g., position of a point in 3D space) and its own pose with respect to the physical environment.

Upon successful localization and mapping, electronic device 200A is able to display virtual content at an appropriate place on the display as the device can use the determined pose with respect to the physical environment. Thus, after (or upon) successful localization and mapping, electronic device 200A displays virtual object 204 using the pose estimate to locate virtual object 204 on display 201. It is intended that virtual object 204 appear to rest on the table, but the error associated with the pose estimate results in electronic device 200A displaying virtual object 204 such that it appears to be floating above the table.

To improve the accuracy of the estimate of the pose of electronic device 200A, more data is needed, particularly with respect to the 3D positions of notable features in the physical environment. A technique for improving position estimates of the notable features is to use data generated at a second device (e.g., electronic device 200B) in addition to data generated at electronic device 200A. By increasing the amount of data (e.g., increasing the number of samples) used for estimating the pose of the device, the error associated with the pose estimate is reduced.

After (or upon) successfully performing localization and mapping, electronic device 200A transmits to a server captured images and the estimated pose of the device at which the images were captured. In some examples, after (or upon) successfully performing localization and mapping, the electronic device also sends inertial data about the movement of the electronic device. Using the captured images and their corresponding poses of the device (and, optionally, the inertial data), the server performs reconstruction by performing a similar mapping function to estimate position data for notable features (e.g., a set of 3D points, lines, segments, planes, and/or other 3D geometric elements and shapes) in the captured images. For example, the position data includes Cartesian coordinates for the corners of cubes 202A and 202B that were captured by the images.

In some examples, electronic device 200A does not transmit to the server the captured images and the estimated pose of the device. In some examples, electronic device 200A performs the reconstructions using the captured images, the estimated pose, and/or data generated at electronic device 200B. In some examples, electronic device 200A uses images captured by electronic device 200A and their corresponding poses to perform a similar mapping function to estimate position data for notable features in the captured images. In some examples, electronic device 200A receives image data captured by electronic device 200B and/or corresponding pose estimates of electronic device 200B. In some examples, electronic device 200B uses motion data and image data captured by electronic device 200B to generate the pose estimate of electronic device 200B, as described above with respect to generation of the pose estimate of electronic device 200A. In some examples, electronic device 200A uses the received image data and/or the corresponding pose estimates of electronic device 200B to generate a pose estimate of electronic device 200A (or improve upon an existing pose estimate). In some examples, electronic device 200B uses images captured by electronic device 200B and their corresponding poses to perform a similar mapping function to estimate position data for notable features in the captured images. In some examples, electronic device 200A receives this position data. In some examples, electronic device 200A uses this position data to generate a pose estimate of electronic device 200A (or improve upon an existing pose estimate). In some examples, the image data captured by electronic device 200A and electronic device 200B corresponds to (e.g., includes data about) one or more portions of the same physical object in the physical environments.

Upon (or after) generating position data for the set of notable features, the server transmits to electronic device 200B the position data of the notable features that define a 3D map with a defined origin. Upon (or after) receiving the position data, electronic device 200B registers to the 3D map by performing localization using the received position data. In particular, electronic device 200B attempts to match the received position data with notable features that electronic device 200B detects in images captured via its camera sensor. Once electronic device 200B matches the received position data with notable features detected by electronic device 200B, electronic device 200B determines its own pose with respect to the 3D map (e.g., with respect to the defined origin).

After (or upon) successfully performing localization, electronic device 200B transmits to the server captured images and the pose of the device at which the images were captured. Electronic device 200A also transmits to the server captured images and the pose of the device at which the images were captured. Performing reconstruction on the captured images and their corresponding poses from electronic device 200A and electronic device 200B, the server generates updated estimates of the position data for the notable features in the captured images. To generate the updated estimates, the server uses a minimization function (e.g., least squares) on the pose data and the position data of the notable features from both devices. In some examples, the processes described above for generating updated estimates of position data can be performed with more than two devices, thereby resulting in more data (e.g., samples) for accurate pose estimation. In some examples, to generate the updated estimates for a dynamic scene (e.g., a scene where the physical objects are moving), the server uses a timestamp corresponding to the time the images were captured, where the timestamp is generated at electronic device 200A and/or 200B. In some examples, the timestamps are used to determine which captured images to compare (e.g., comparison between images occurs between images that are captured at the same time or within some threshold (e.g., 30 ms)). In some examples, when the scene is static (e.g., the physical objects are not moving), the server does not use a timestamp to generate the updated estimates.

Upon (or after) generating updated estimates for the position data of the notable features, the server transmits the updated estimates to electronic device 200A and electronic device 200B. The updated estimates correspond (e.g., include updates) to the notable features that electronic device 200A and/or electronic device 200B used for performing localization. In some examples, the updated estimates correspond to some or all of the notable features. In some examples, the updated estimates include new 3D features other than the 3D features that were used by a particular device for performing localization. For example, the updated estimate can include position data for a notable feature that was observed by one electronic device, but not the other. In some examples, the updated estimates only include new 3D features.

Figure 2D:
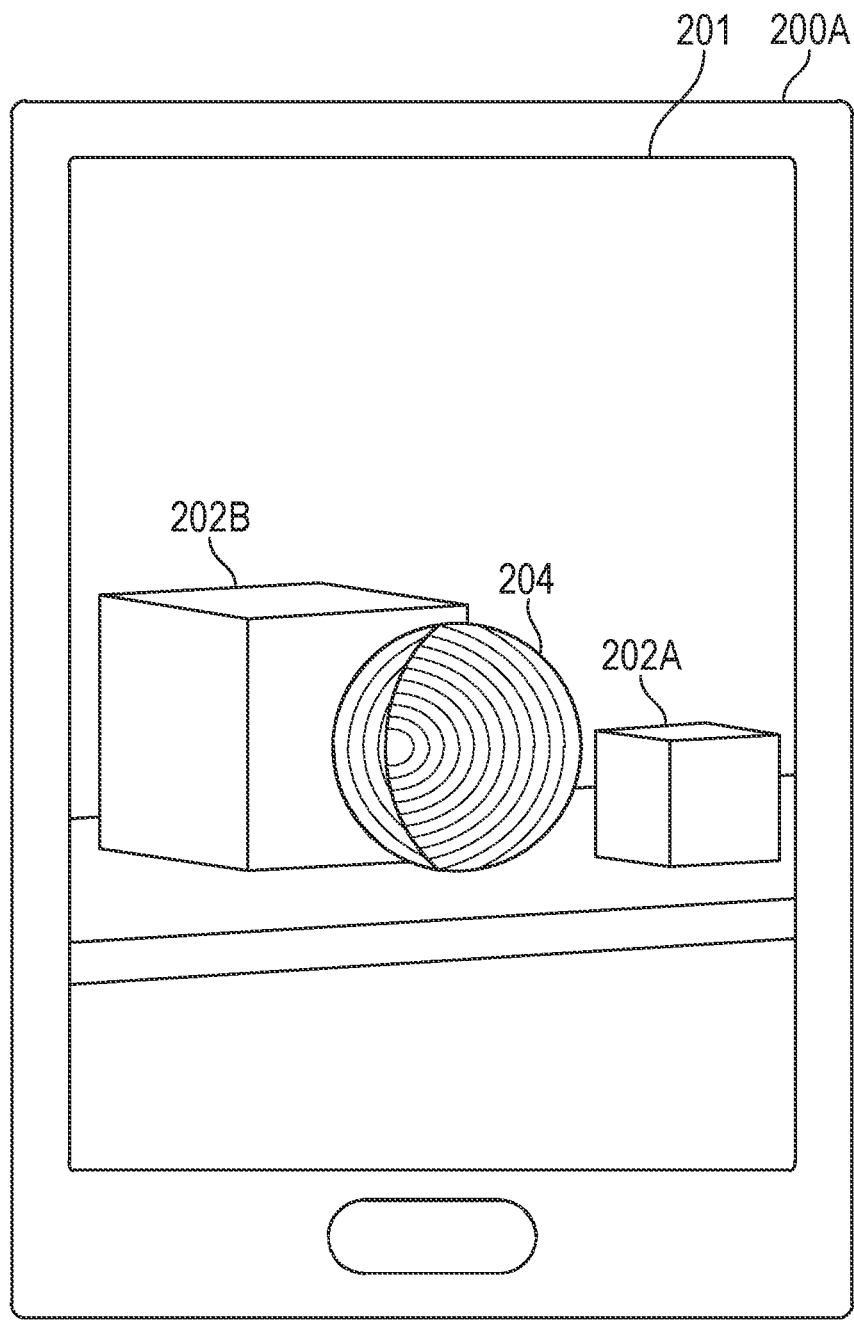

At FIG. 2D, upon (or after) receiving the updated estimates from the server, electronic device 200A performs localization using the updated estimates. In particular, electronic device 200A generates a new pose of the device based on the received updated estimates from the server. Similarly, electronic device 200B performs localization and generates a new pose of the device based on the received updated estimates from the server.

After electronic device 200A and electronic device 200B update the estimates of their respective poses using the updated estimates, some of the processes discussed above are repeated to continue generating further updated estimates of the pose of each device. Electronic devices 200A and 200B continue to transmit to the server captured images of the physical environment and the pose at which the images were captured. The server continues to perform reconstruction using the images and their corresponding poses to generate updated estimates of the position data for the notable features in the captured images. The server transmits the updated estimates to electronic devices 200A and 200B, and electronic devices 200A and 200B again update the estimates of their respective poses. This cycle repeats, thereby continually improving the accuracy of the position estimates of the 3D features. More accurate position estimates of the 3D features result in more accurate estimates (e.g., estimates with reduced error) of the poses of the electronic devices.

Figure 3:
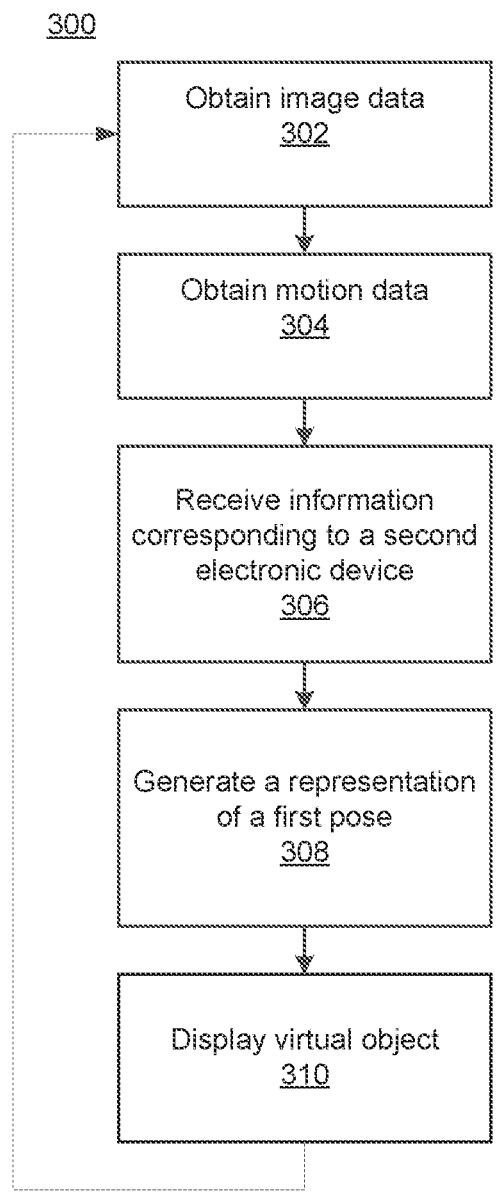
FIG. 3 is a flow diagram illustrating an exemplary method for determining a pose of an electronic device from the perspective of the electronic device.

FIG. 3 is a flow diagram illustrating an exemplary method for determining (e.g., estimating) a pose of an electronic device (e.g., 200A, 200B). In some examples, the method is performed by electronic device 200A and/or electronic device 200B.

At block 302, an electronic device (e.g., 200A, 200B) obtains first image data. In some examples, the first image data uses a raw image format. In some examples, the first image data uses a compressed file format (e.g., jpeg). In some examples, the first image data (e.g., captured images) is obtained using the camera sensor (e.g., image sensor(s) 108). In some examples, the first image data corresponds to (e.g., includes data of or about) physical objects in a physical environment (e.g., 202A, 202B).

At block 304, the electronic device obtains motion data using the motion sensor (e.g., orientation sensor(s) 110). In some examples, the motion sensor is one or more inertial measurement units. In some examples, the motion data includes acceleration, rotation, and/or altitude data. In some examples, the motion data is measured with respect to a known frame of reference.

At block 306, the electronic device receives information corresponding to a second electronic device. In some examples, the information corresponding to the second electronic device includes second image data and a representation of a pose of the second electronic device. In some examples, the second image data uses a raw image format. In some examples, the second image data uses a compressed file format (e.g., jpeg). In some examples, the second image data (e.g., captured images) is obtained using a camera sensor of the second electronic device. In some examples, the second image data corresponds to (e.g., includes data of or about) physical objects in a physical environment (e.g., 202A, 202B). In some examples, the first image data and the second image data corresponds to (e.g., includes data of or about) the same physical objects in the physical environments (e.g., 202A, 202B). In some examples, the representation of the pose of the second electronic device is generated at the second electronic device using (e.g., based on) image data captured by the second electronic device and motion data from a motion sensor of the second electronic device. In some examples, the representation of the pose of the second electronic device is generated at a third electronic device (e.g., a server in communication with the first and second electronic devices).

In some examples, the information corresponding to the second electronic device includes a representation of one or more features in a three-dimensional space (e.g., physical environment) obtained by or using information obtained by the second electronic device. In some examples, the representation of the one or more features are Cartesian coordinates of one or more features in a physical environment (e.g., corners of cubes 202A and 202B that are in the field of view of the camera sensor). In some examples, features include points, lines, segments, planes, and/or other 3D geometric elements and shapes. In some examples, the representation of one or more features corresponds to physical objects (e.g., 202A, 202B) in a physical environment (e.g., the representation of one or more features includes positions in space of certain features of the physical objects). In some examples, the representation of the one or more features in the three-dimensional space is generated at a third electronic device (e.g., host server in communication with 202A and/or 202B; 202A; 202B) using initial image data transmitted by the first electronic device and a representation of an initial pose transmitted by the first electronic device. In some examples, the representation of the one or more features in the three-dimensional space is generated using image data transmitted by a second electronic device (e.g., an electronic device with a display, a camera sensor, and a motion sensor) and a representation of a pose transmitted by the second electronic device, and wherein the second electronic device is different from the first electronic device and the third electronic device. Thus, in some examples, the received representation of the one or more features in the three-dimensional space is based on image data captured by multiple electronic devices and on representations of poses of the multiple electronic devices. As mentioned above, the representation of one or more features in the three-dimensional space can include updated positions for some or all of the features detected by the first electronic device in the image data or positions for features that have not yet been detected or observed by the first electronic device. For example, the representation of one or more features can include positions for only those features whose positions have been updated, positions for all features determined by the second (or third) electronic device, and/or positions for only those features that have not yet been detected or observed by the first electronic device. In some examples, the representation of the first pose and the received representation of the one or more features are on the same coordinate system (e.g., Cartesian coordinate system, spherical coordinate system). In some examples, the representation of the first pose and the received representation of the pose of the second electronic device are on the same coordinate system. In some examples, the first pose of the first device is based on a rotation and a translation of the first electronic device, where the rotation and translation are on the same coordinate system.

At block 308, the electronic device generates a representation of a first pose of the first electronic device using the first image data, the motion data, and the information corresponding to the second electronic device. In some examples, the representation of the first pose of the first electronic device includes position and orientation defined, for example, by a rotation and translation with respect to a reference 3D coordinate system. In some examples, the first pose is the pose at which at least a portion of the image data was taken. In some examples, generating the representation of the first pose of the first electric device includes generating or using a representation of one or more features (e.g., position data) corresponding to one or more features extracted from the image data. In some examples, features include points, lines, segments, planes, and/or other 3D geometric elements and shapes.

In some examples, prior to receiving the information corresponding to the second electronic device, the electronic device obtains initial image data (e.g., image data that is different from the first image data). In some examples, prior to receiving the information corresponding to the second electronic device, the electronic device obtains initial motion data using the motion sensor. In some examples, prior to receiving the information corresponding to the second electronic device, the electronic device generates a representation of an initial pose of the first electronic device using the initial image data and the initial motion data. In some examples, prior to receiving the information corresponding to the second electronic device, the electronic device transmits the initial image data and the representation of the initial pose of the first electronic device. In some examples, the first electronic device transmits the initial image data and the representation of the initial pose to the second electronic device and/or the third electronic device.

In some examples, the electronic device does not transmit the initial image data and the representation of the initial pose, and instead transmits a representation of one or more features (e.g., position data) corresponding to one or more features extracted from (e.g., corresponding to) the image data and/or motion data. For example, the first electronic device transmits the representation of the one or more features to the second electronic device.

At block 310, the electronic device displays, on the display (e.g., 201), a virtual object (e.g., 204), wherein the displaying of the virtual object is based on the representation of the first pose of the first electronic device. In some examples, the electronic device displays a representation of a physical object (e.g., 202A, 202B), wherein the representation of the physical object is concurrently displayed with the virtual object (e.g., 204). For example, the physical object is displayed such that it partially (e.g., but not fully) overlaps the representation of the virtual object and therefore that portion of the virtual object is not displayed. In some examples, the electronic device only displays virtual content, where the display of virtual content is based on the determined pose of the electronic device.

In some examples, after (or in response to) displaying the virtual object at block 310, the electronic device obtains new motion data, new image data, new representations of a pose of the second electronic device, and/or new representation(s) of one or more features (e.g., position data) in the physical environment. Using some or all of the newly obtained data, the electronic device generates a new representation of a pose of the first electronic device, as described with respect to block 308.

Some of the examples described above with respect to method 300 involve an interaction between two electronic devices and a host server. For example, a first electronic device and a second electronic device can provide data to a server, where the server can generate a representation of one or more features based on the provided data. In some examples, the first electronic device (or the second electronic device) generates a new (e.g., updated) representation of the pose of the first electronic device (or the second electronic device) using the representation of one or more features generated by the server. Additionally, some of the examples described above with respect to method 300 can be performed by two electronic devices, with one of them acting as a host server. For example, the first electronic device can generate a new representation of the pose of the first electronic device using data generated at the second electronic device. In some examples, the second electronic device transmits image data captured by the second electronic device and/or corresponding representations of poses of the second electronic device to the first electronic device. In some examples, the second electronic device can generate the representation of one or more features using image data and motion (e.g., orientation) data obtained by the second electronic device. In some examples, the second electronic device transmits the representation of the one or more features to the first electronic device.

Figure 4:
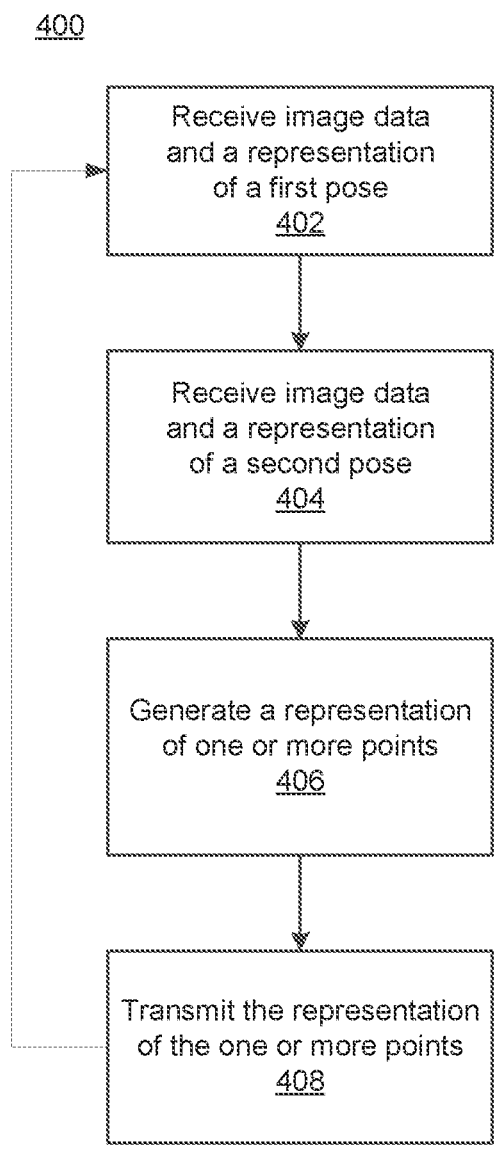
FIG. 4 is a flow diagram illustrating an exemplary method for determining a pose of an electronic device from the perspective of a server.

FIG. 4 is a flow diagram illustrating an exemplary method 400 for reconstructing a using image and position data received from one or more electronic devices (e.g., 200A, 200B). In some examples, the method is performed by a server in communication with electronic device 200A and/or electronic device 200B. The server optionally includes some or all of the features of system 100. In some examples, the method is performed by electronic device 200A and/or electronic device 200B (e.g., one of the electronic devices acts as the server for the other electronic device).

At block 402, an electronic device (e.g., 100, 200A, 200B) receives, from a second electronic device (e.g., 200A, 200B), first image data and a representation of a first pose (e.g., position and orientation defined, for example, by a rotation and translation with respect to a reference 3D coordinate system) of the second electronic device in a three-dimensional space, wherein the representation of the first pose of the second electronic device corresponds to the first image data. In some examples, the first image data and representation of a first pose is received from a second electronic device performing block 308 of method 300. In some examples, the image data corresponds to (e.g., includes data of) physical objects in a physical environment (e.g., 202A, 202B). In some examples, the pose for which the representation is received is the pose at which at least a portion of the image data was taken. In some examples, the image data uses a raw image format. In some examples, the image data uses a compressed file format (e.g., jpeg). In some examples, the first image data is obtained using a first camera sensor (e.g., image sensor(s) 108) of the second electronic device. In some examples, the electronic device does not receive the image data and instead receives from the second electronic device a representation of one or more features (e.g., position data) corresponding to one or more features extracted from the image data. In some examples, features include points, lines, segments, planes, and/or other 3D geometric elements and shapes.

At block 404, the electronic device receives, from a third electronic device (e.g., 200A, 200B), second image data and a representation of a second pose of the third electronic device in the three-dimensional space, wherein the representation of the second pose of the third electronic device corresponds to the second image data. In some examples, the image data corresponds to (e.g., includes data of) physical objects in a physical environment (e.g., 202A, 202B). In some examples, the pose for which the representation is received is the pose at which at least a portion of the image data was taken. In some examples, the image data uses a raw image format. In some examples, the image data uses a compressed file format (e.g., jpeg). In some examples, the second image data is obtained using a second camera sensor (e.g., image sensor(s) 108) of the third electronic device. In some examples, the representation of the first pose of the second electronic device, and the representation of the second pose of the third electronic device are on the same coordinate system (e.g., Cartesian coordinate system, spherical coordinate system). In some examples, the electronic device does not receive the image data and instead receives from the third electronic device a representation of one or more features (e.g., position data) corresponding to one or more features extracted from the image data.

At block 406, the electronic device generates a representation of one or more features in the three-dimensional space, wherein the representation of the one or more features is generated using the first image data, the representation of the first pose, the second image data, and the representation of the second pose. In some examples, the representation of one or more features corresponds to physical objects (e.g., 202A, 202B) in a physical environment (e.g., the representation of one or more features includes positions in space of certain features of the physical objects). In some examples, features include points, lines, segments, planes, and/or other 3D geometric elements and shapes. In some examples, generating the representation of the one or more features in the three-dimensional space occurs in response to (or subsequent to) receiving the first image data from the second electronic device and receiving the second image data from the third electronic device. In some examples, generating the representation of the one or more features occurs in response to (or subsequent to) receiving the representation of the first pose and the representation of the second pose. In some examples, the representation of the one or more features is generated by performing a minimization function on at a least a portion (in some examples, minimization function is performed on all the data) of the first image data, the representation of the first pose of the second electronic device, the second image data, and the representation of the second pose of the third electronic device. In some examples, the representation of the one or more features is generated by performing a minimization function on at a least a portion (in some examples, minimization function is performed on all the data) of the representation of one or more features received from the second electronic device, the representation of the first pose of the second electronic device, the representation of one or more features received from the third electronic device, and the representation of the second pose of the third electronic device.

At block 408, the electronic device transmits the representation of the one or more features to the second electronic device and the third electronic device, wherein the representation of the one or more features is configured to be used by the second electronic device to generate a representation of a third pose (e.g., rotation, translation) of the second electronic device, and wherein the representation of the one or more features is configured to be used by the third electronic device to generate a representation of a fourth pose (e.g., rotation, translation) of the third electronic device.

In some examples, subsequent to transmitting the representation of the one or more features to the second electronic device and the third electronic device, the electronic device receives, from the second electronic device, third image data and a representation of a fifth pose (e.g., position and orientation defined, for example, by a rotation and translation with respect to a reference 3D coordinate system) of the second electronic device in the three-dimensional space, wherein the representation of the fifth pose (e.g., position and orientation defined, for example, by a rotation and translation with respect to a reference 3D coordinate system) of the second electronic device corresponds to the third image data (e.g., the pose is the pose at which at least a portion of the image data was taken); receives, from the third electronic device, fourth image data and a representation of a sixth pose (e.g., position and orientation defined, for example, by a rotation and translation with respect to a reference 3D coordinate system) of the third electronic device in the three-dimensional space, wherein the representation of the sixth pose of the third electronic device corresponds to the fourth image data (e.g., the pose is the pose at which at least a portion of the image data was taken); generates a representation of one or more features in the three-dimensional space, wherein the representation of the one or more features is generated using the third image data, the representation of the firth pose, the fourth image data, and the representation of the sixth pose; and transmits the representation of the one or more features to the second electronic device and the third electronic device, wherein the representation of the one or more features is configured to be used by the second electronic device to generate a representation of a seventh pose (e.g., rotation, translation) of the second electronic device, and wherein the representation of the one or more features is configured to be used by the third electronic device to generate a representation of an eighth pose (e.g., rotation, translation) of the third electronic device. In some examples, features include points, lines, segments, planes, and/or other 3D geometric elements and shapes.

In some examples, the electronic device can transmit representations for some or all of the features generated at block 406. For example, the electronic device can transmit representations for all features generated at block 406, only those features whose positions have been updated from a previous iteration of method 400, only those features that have not been previously sent to the second or third electronic device, or any other desired subset of features.

Advantageously, methods 300 and 400 improve the accuracy and speed of localization and mapping by providing more data on which to operate. Additionally, methods 300 and 400 provide an electronic device with mapping data (e.g., position data of features) for areas of an environment that have not been observed by the electronic device. This can result in faster localization of the electronic device when encountering those areas of the environment as well as faster mapping of an environment.

What is claimed is:

1. A first electronic device, comprising:
one or more processors; and
memory storing one or more programs configured to be executed by the one or more processors, the one or more programs including instructions for:
  receiving, from a second electronic device, first image data and a representation of a first pose of the second electronic device in a three-dimensional space;
  receiving, from a third electronic device, second image data and a representation of a second pose of the third electronic device in the three-dimensional space;
  generating a representation of one or more features in the three-dimensional space using the first image data, the representation of the first pose, the second image data, and the representation of the second pose; and
  transmitting the representation of the one or more features to the second electronic device and the third electronic device for generating representations of poses of the second electronic device and the third electronic device.

2. The first electronic device of claim 1, wherein:
the representation of the first pose of the second electronic device corresponds to the first image data; and
the representation of the second pose of the third electronic device corresponds to the second image data.

3. The first electronic device of claim 1, wherein:
the representation of the one or more features is configured to be used by the second electronic device to generate a representation of a third pose of the second electronic device, and
the representation of the one or more features is configured to be used by the third electronic device to generate a representation of a fourth pose of the third electronic device.

4. The first electronic device of claim 1, wherein the first image data is obtained using a first camera sensor of the second electronic device, and wherein the second image data is obtained using a second camera sensor of the third electronic device.

5. The first electronic device of claim 1, wherein the representation of the first pose of the second electronic device, and the representation of the second pose of the third electronic device are on the same coordinate system.

6. The first electronic device of claim 1, wherein the representation of the one or more features is generated by performing a minimization function on at a least a portion of the first image data, the representation of the first pose of the second electronic device, the second image data, and the representation of the second pose of the third electronic device.

7. The first electronic device of claim 1, the one or more programs further including instructions for:
  subsequent to transmitting the representation of the one or more features to the second electronic device and the third electronic device:
    receiving, from the second electronic device, third image data and a representation of a fifth pose of the second electronic device in the three-dimensional space,
      wherein the representation of the fifth pose of the second electronic device corresponds to the third image data;
    receiving, from the third electronic device, fourth image data and a representation of a sixth pose of the third electronic device in the three-dimensional space,
      wherein the representation of the sixth pose of the third electronic device corresponds to the fourth image data;
    generating a second representation of one or more features in the three-dimensional space,
      wherein the second representation of the one or more features is generated using the third image data, the representation of the fifth pose, the fourth image data, and the representation of the sixth pose; and
    transmitting the second representation of the one or more features to the second electronic device and the third electronic device,
      wherein the second representation of the one or more features is configured to be used by the second electronic device to generate a representation of a seventh pose of the second electronic device, and
      wherein the second representation of the one or more features is configured to be used by the third electronic device to generate a representation of an eighth pose of the third electronic device.

8. A non-transitory computer-readable storage medium storing one or more programs configured to be executed by one or more processors of a first electronic device, the one or more programs including instructions for:
receiving, from a second electronic device, first image data and a representation of a first pose of the second electronic device in a three-dimensional space;
receiving, from a third electronic device, second image data and a representation of a second pose of the third electronic device in the three-dimensional space;
generating a representation of one or more features in the three-dimensional space using the first image data, the representation of the first pose, the second image data, and the representation of the second pose; and
transmitting the representation of the one or more features to the second electronic device and the third electronic device for generating representations of poses of the second electronic device and the third electronic device.

9. The computer-readable storage medium of claim 8, wherein:
the representation of the first pose of the second electronic device corresponds to the first image data; and
the representation of the second pose of the third electronic device corresponds to the second image data.

10. The computer-readable storage medium of claim 8, wherein:
the representation of the one or more features is configured to be used by the second electronic device to generate a representation of a third pose of the second electronic device, and
the representation of the one or more features is configured to be used by the third electronic device to generate a representation of a fourth pose of the third electronic device.

11. The computer-readable storage medium of claim 8, wherein the first image data is obtained using a first camera sensor of the second electronic device, and wherein the second image data is obtained using a second camera sensor of the third electronic device.

12. The computer-readable storage medium of claim 8, wherein the representation of the first pose of the second electronic device, and the representation of the second pose of the third electronic device are on the same coordinate system.

13. The computer-readable storage medium of claim 8, wherein the representation of the one or more features is generated by performing a minimization function on at a least a portion of the first image data, the representation of the first pose of the second electronic device, the second image data, and the representation of the second pose of the third electronic device.

14. The computer-readable storage medium of claim 8, the one or more programs further including instructions for:
subsequent to transmitting the representation of the one or more features to the second electronic device and the third electronic device:
receiving, from the second electronic device, third image data and a representation of a fifth pose of the second electronic device in the three-dimensional space,
wherein the representation of the fifth pose of the second electronic device corresponds to the third image data;
receiving, from the third electronic device, fourth image data and a representation of a sixth pose of the third electronic device in the three-dimensional space,
wherein the representation of the sixth pose of the third electronic device corresponds to the fourth image data;
generating a second representation of one or more features in the three-dimensional space,
wherein the second representation of the one or more features is generated using the third image data, the representation of the fifth pose, the fourth image data, and the representation of the sixth pose; and
transmitting the second representation of the one or more features to the second electronic device and the third electronic device,
wherein the second representation of the one or more features is configured to be used by the second electronic device to generate a representation of a seventh pose of the second electronic device, and
wherein the second representation of the one or more features is configured to be used by the third electronic device to generate a representation of an eighth pose of the third electronic device.

15. A method, comprising:
at a first electronic device:
receiving, from a second electronic device, first image data and a representation of a first pose of the second electronic device in a three-dimensional space;
receiving, from a third electronic device, second image data and a representation of a second pose of the third electronic device in the three-dimensional space;
generating a representation of one or more features in the three-dimensional space using the first image data, the representation of the first pose, the second image data, and the representation of the second pose; and
transmitting the representation of the one or more features to the second electronic device and the third electronic device for generating representations of poses of the second electronic device and the third electronic device.

16. The method of claim 15, wherein:
the representation of the first pose of the second electronic device corresponds to the first image data;
the representation of the second pose of the third electronic device corresponds to the second image data;
the representation of the one or more features is configured to be used by the second electronic device to generate a representation of a third pose of the second electronic device, and
the representation of the one or more features is configured to be used by the third electronic device to generate a representation of a fourth pose of the third electronic device.

17. The method of claim 15, wherein the first image data is obtained using a first camera sensor of the second electronic device, and wherein the second image data is obtained using a second camera sensor of the third electronic device.

18. The method of claim 15, wherein the representation of the first pose of the second electronic device, and the representation of the second pose of the third electronic device are on the same coordinate system.

19. The method of claim 15, wherein the representation of the one or more features is generated by performing a minimization function on at a least a portion of the first image data, the representation of the first pose of the second electronic device, the second image data, and the representation of the second pose of the third electronic device.

20. The method of claim 15, further comprising:
subsequent to transmitting the representation of the one or more features to the second electronic device and the third electronic device:
receiving, from the second electronic device, third image data and a representation of a fifth pose of the second electronic device in the three-dimensional space,
wherein the representation of the fifth pose of the second electronic device corresponds to the third image data;
receiving, from the third electronic device, fourth image data and a representation of a sixth pose of the third electronic device in the three-dimensional space,
wherein the representation of the sixth pose of the third electronic device corresponds to the fourth image data;
generating a second representation of one or more features in the three-dimensional space,
wherein the second representation of the one or more features is generated using the third image data, the representation of the fifth pose, the fourth image data, and the representation of the sixth pose; and
transmitting the second representation of the one or more features to the second electronic device and the third electronic device,
wherein the second representation of the one or more features is configured to be used by the second electronic device to generate a representation of a seventh pose of the second electronic device, and
wherein the second representation of the one or more features is configured to be used by the third electronic device to generate a representation of an eighth pose of the third electronic device.

* * * * *